July 31, 1934.  H. D. BLAKE  1,968,597
IGNITION CONTROLLING DEVICE FOR PHOTOGRAPHIC FLASH LIGHT LAMPS
Filed Sept. 17, 1932
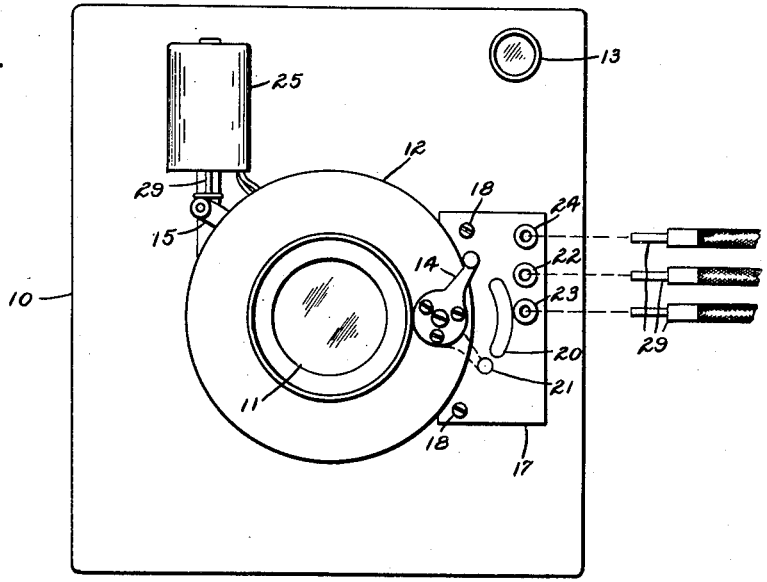
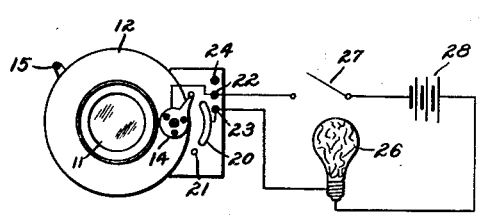
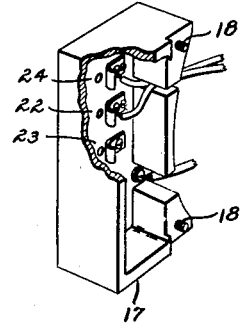
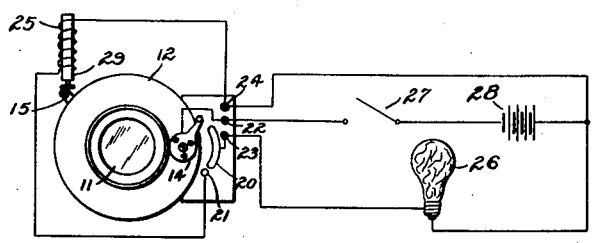
INVENTOR:
HAROLD D. BLAKE,
BY Chas V. Mullan
HIS ATTORNEY.

Patented July 31, 1934

1,968,597

UNITED STATES PATENT OFFICE 1,968,597

IGNITION CONTROLLING DEVICE FOR PHOTOGRAPHIC FLASH LIGHT LAMPS

Harold D. Blake, Cleveland Heights, Ohio, assignor to General Electric Company, a corporation of New York Application September 17, 1932, Serial No. 633,637

6 Claims. (Cl. 67—29)

My invention relates to photography and more particularly to electrical switching apparatus for controlling the ignition of flash lamps and the like. Still more particularly my invention relates to switching devices, operating through shutter movement, for closing in proper time relation thereto the electrical ignition circuit of a flash lamp or the like. The ignition of the light-giving means must necessarily take place after the shutter has partially opened, due to the very short period of time required to set off said device in comparison to the time required to open the shutter. In former devices the shutter was usually either more quickly or more slowly opened than was desired as the speed of shutter action varied individually and was not consistent.

One object of my invention is to provide switching means for closing an electrical circuit after partial operation of the camera shutter. Another object of my invention is to provide switching means for opening one electrical circuit and closing another during operation of camera shutter. Still another object of my invention is to provide a switch operative through actual shutter movement which can easily be attached to cameras now in use. Other features and advantages of my invention will appear from the drawing and description which follow of the switch and methods of use.

Now referring to the drawing, Fig. 1 is a head-on elevation of a camera embodying the switch of my invention; Fig. 2 is a perspective view of the shutter priming lever; Fig. 3 is a perspective view of the contact block used therewith; and Figs. 4 and 5 are wiring diagrams of two methods of using the switch of my invention.

In the specific application of my invention shown in Fig. 1, the switching mechanism is mounted on the front of the camera 10 which is provided with a lens 11, a shutter 12 and a finder 13. The shutter which is of a well-known type is operated by priming and release levers 14 and 15 respectively and operates said switching mechanism through priming lever 14. To the end of the priming lever 14 is attached contact pin 16 (Fig. 2), and to a flange (not shown) extending from the shutter behind said lever is attached block 17 (Figs. 1 and 3) by screws 18. Contact pin 16 is caused to bear against the surface of said block by spring 19 which, with contacts or inserts 20 and 21 in the face of the block, constitutes the switching means. Priming lever 14 and contact 20 are, as shown in Fig. 4, wired to jacks 22 and 23 respectively and contact 21 and jack 24 are wired to respective ends of the winding of solenoid 25. Other parts required for operation are the flash lamp 26, switch 27 and battery 28 or other source of direct current. These parts are wired as shown and are connected to block 17 by plugs 29 which are inserted in jacks 22, 23 and 24.

To operate, the shutter 12 is first primed or set by swinging lever 14 into the position indicated by dotted lines in Fig. 1. The camera should then be aimed by use of finder 13 whereupon the shutter and the flash lamp may be operated in proper time relation to each other by closing switch 27. As contact 21 and contact pin 16 are in engagement with each other when the circuit is closed, current passes into the solenoid 25 which operates, through armature 29, release lever 15. This causes the shutter to operate. With the release of the shutter, priming lever 14 is carried upward and pin 16 engages contact 20 at approximately the instant the shutter becomes fully opened. The flash lamp ignition circuit is therefore closed and the lamp is given time for complete operation before the shutter reaches the closed position. In one case, which is typical, the particular flash lamps used emitted the major portion of their light in from .015 to .020 second and the shutter required from .0174 to .0544 second to come to full open position after release. The advantage of operating the flash lamp ignition circuit by mechanism such as priming lever 14 which is actuated by actual movement of the shutter will be apparent.

Another form of my invention is illustrated in Fig. 5. In this arrangement the solenoid is dispensed with and the device is operated manually through the usual shutter release lever 15. To operate, the shutter is first primed by swinging the lever 14 down and switch 27 closed whereupon the photograph may be taken in the usual manner. Either direct or alternating current may be utilized for this form of the invention.

What I claim as new and desire to secure by Letters Patent of the United States, is:

1. In a device of the character described, the combination of a camera comprising a shutter, operating mechanism for said shutter comprising a movable release lever and a movable priming lever, a flash lamp and an electric ignition circuit connected thereto, and a contact connected in said ignition circuit and so disposed in the path of movement of said priming lever that it is engaged by said priming lever after the latter has left its priming position and after the shutter has started to open, the operation of said parts being so timed that the flashing of said lamp occurs when the shutter is completely open.

2. In a device of the character described, the combination of a camera comprising a shutter, operating mechanism for said shutter comprising a movable release lever and a movable priming lever, a solenoid for actuating said release lever, an electrical solenoid operating circuit, a flash lamp with an electrical ignition circuit connected thereto including a contact mounted in the path of travel of said priming lever that is engaged by said priming lever after the shutter has started to open to close said ignition circuit, the operating of said parts being so timed that the flashing of said lamp occurs when the shutter is completely open.

3. In a device of the character described, the combination of a camera comprising a shutter, shutter actuating mechanism comprising a rotatable lever, a contact pin resiliently mounted on the end of said lever, a flash lamp and electric ignition circuit connected thereto and a segmental contact disposed in the path of rotation of said lever and connected in said electric circuit so that engagement of said lever contact pin therewith completes said electric circuit.

4. In a device of the class described, the combination of a camera comprising a shutter, operating mechanism for said shutter comprising a movable priming lever, a flash lamp and an electric ignition circuit connected thereto, a contact disposed in the path of movement of said priming lever, switch means for setting said electric circuit after the priming lever has been moved to its priming position, and a movable release lever for releasing said shutter and priming lever so that said priming lever engages said contact after the shutter has started to open and flashes said lamp when the shutter is completely open.

5. In a device of the character described, the combination of a camera comprising a shutter, shutter actuating mechanism comprising a movable lever, a solenoid for actuating said lever, an electrical solenoid operating circuit, a priming lever for said shutter, a flash lamp with electrical ignition circuit connected to said priming lever, a contact disposed in the path of movement of said priming lever and connected in said ignition circuit, a second contact disposed at one end of the path of movement of said priming lever and connected in said solenoid circuit, and means for closing said solenoid circuit to actuate said movable lever and open said shutter, said priming lever in turn engaging said first contact to close the said flash lamp ignition circuit.

6. In a device of the character described, the combination of a camera comprising a shutter, operating mechanism for said shutter comprising a movable release lever and a movable priming lever, a solenoid for actuating said release lever, an electrical solenoid operating circuit, a flash lamp with an electrical ignition circuit connected thereto, and a contact disposed in the path of travel of said priming lever and connected in said flash lamp circuit, a second contact located at the priming position of said priming lever and connected in said solenoid circuit, and switch means for closing said solenoid circuit to actuate said release lever which opens said shutter and releases said priming lever, said priming lever then engaging said first contact to close the flash lamp ignition circuit.

HAROLD D. BLAKE.